United States Patent [19]

Hayes et al.

[11] Patent Number: 5,053,100
[45] Date of Patent: Oct. 1, 1991

[54] METHOD OF MAKING APPARATUS FOR DISPENSING SMALL AMOUNTS OF FLUIDS

[75] Inventors: Donald J. Hayes, Plano; John R. Pies, Dallas, both of Tex.

[73] Assignee: Microfab Technologies, Inc., Plano, Tex.

[21] Appl. No.: 401,858

[22] Filed: Sep. 1, 1989

[51] Int. Cl.[5] .................. B01L 3/02; B29C 65/48
[52] U.S. Cl. ..................... 156/294; 65/108; 65/283; 222/420; 239/102.2; 422/100
[58] Field of Search ............... 156/294, 305; 239/102.2; 222/420; 422/100; 65/283, 108

[56] References Cited

U.S. PATENT DOCUMENTS

| | | | |
|---|---|---|---|
| 2,481,620 | 9/1949 | Rosenthal | 239/102.2 |
| 3,476,291 | 11/1969 | Glaser | 222/420 |
| 4,418,354 | 11/1983 | Perdvijn | 239/102.2 |
| 4,485,386 | 11/1984 | Dagna et al. | 346/140 PD |
| 4,600,424 | 7/1986 | Flaming | 65/108 |

FOREIGN PATENT DOCUMENTS

| | | | |
|---|---|---|---|
| 2915851 | 10/1980 | Fed. Rep. of Germany | 422/100 |
| 0672495 | 7/1979 | U.S.S.R. | 422/100 |

Primary Examiner—Michael W. Ball
Assistant Examiner—Steven D. Maki
Attorney, Agent, or Firm—Richards, Medlock & Andrews

[57] ABSTRACT

A method of making apparatus for dispensing very small and precise amounts of fluids is disclosed which includes forming a main body with a bore formed coaxially therethrough, attaching a first housing to the main body such that the bores thereof are coaxial, attaching a driver device to the first housing, attaching a second housing to the main body such that the driver device is enclosed by the second housing, attaching a weight to the end of the first housing and applying heat to the first housing at a predetermined location between the weight and the second housing, whereby the end of the first housing is pulled away from the main body to form a tapered end portion on the first housing.

9 Claims, 3 Drawing Sheets

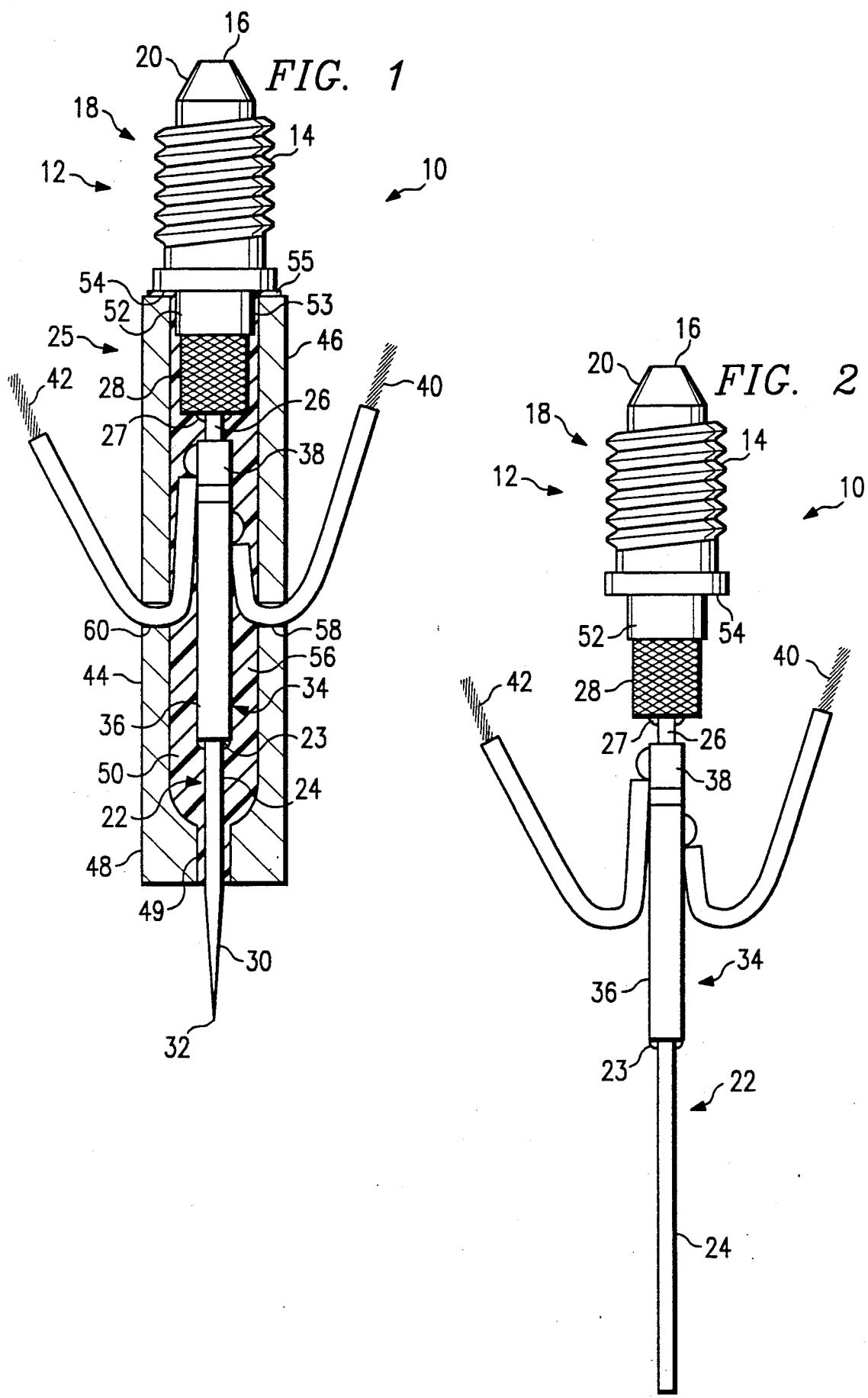

METHOD OF MAKING APPARATUS FOR DISPENSING SMALL AMOUNTS OF FLUIDS

BACKGROUND OF THE INVENTION

1. Field of the Invention

The present invention relates in general to the dispensing of a fluid More particularly, it relates to the method of making apparatus for dispensing very small and precise amounts of fluids.

2. Description of the Prior Art

Although this invention provides apparatus which is applicable to the dispensing of very small and precise amounts of numerous and various types of fluids for various purposes, it has been found particularly useful in the environment of dispensing drugs onto or into tissue.

Miniature pumping and injecting devices are used extensively in biology and neuroscience for the dispensing and injecting fluids onto and into tissues, organs and cells.

The above applications are severely limited by current pumping technology. The present invention is intended to provide a solution to various prior art deficiencies including the tendency of the prior art systems to clog and the fluid flow rates must be relatively high. Very small volumes can not be dispensed with precision.

SUMMARY OF THE INVENTION

The present invention provides a method of making apparatus for dispensing very small and precise amounts of fluids. The method comprises the steps of forming a main body portion having an upper portion and a lower portion with a bore formed coaxially therethrough; forming a first housing having a first end, a second end and a bore formed coaxially therethrough; attaching the second end of the first housing to the lower portion of the main body portion such that the bores are coaxial; attaching a driver device to the first housing at a predetermined location; forming a second housing having a first end and a second end; attaching the first end of the second housing to the lower portion of the main body portion such that the driver device is enclosed by the second housing; attaching a weight to the first end of the first housing; and applying heat to the first housing at a predetermined location between the weight and the second end of the second housing, whereby the first end of the first housing is pulled away from the main body portion to form a tapered end portion on the first housing.

BRIEF DESCRIPTION OF THE DRAWING

FIG. 1 is a simplified partial sectional view showing completed apparatus made by the present inventive method;

FIG. 2 is a simplified side elevational view showing a partially completed apparatus made by the present inventive method;

DESCRIPTION OF THE PREFERRED EMBODIMENT

Figure 3:
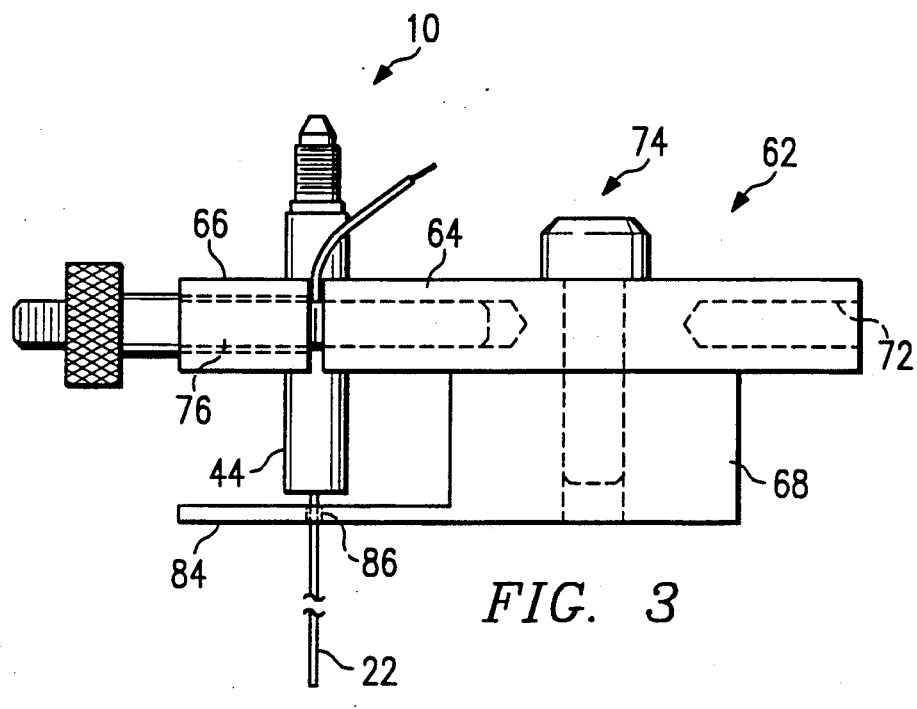
FIG. 3 is a simplified side elevational view of a clamp and alignment tool used in the present inventive method.

Referring to the drawing and in particular to FIG. 1, apparatus for dispensing a very small and precise amount of a fluid and made by the present inventive method is generally referred to by reference numeral 10. For purposes of brevity, apparatus for dispensing a very small and precise amount of a fluid will be referred to, throughout this description, as a picopump 10.

Picopump 10 comprises a main body portion 12 having connector means 14 and a duct or bore 16 of predetermined diameter formed generally coaxially therethrough to allow the passage of fluid through said main body portion 12. In the preferred embodiment, connector means 14 comprises threads formed on the outer surface of upper portion 18 of said main body portion 12. Connector means 14 in conjunction with first end portion 20 of upper portion 18 allow tubing to be removably attached to main body portion 12 for supplying fluids to picopump 10. In the preferred embodiment, first end portion 20 is tapered.

First housing 22 of predetermined length and predetermined diameter includes a first end 24 and a second end 26. Second end 26 is operatively attached to the second end portion 28 of main body portion 12 and coaxial with duct or bore 16 to allow fluid from duct or bore 16 to enter the interior of first housing 22. In the preferred embodiment, second end 26 is operatively attached by adhesive material 27. First end 24 is drawn to form a tapered end portion 30 with an exit aperture 32 of one to fifty microns in diameter. In the preferred embodiment, first housing 22 is tubular in shape and is formed from glass.

A driver device 34 structured in the form of a housing is positioned around and in operative contact with first housing 22. In the preferred embodiment, driver device 34 is attached to first housing 22 by adhesive material 23. Driver device 34 comprises an outer portion 36 and an inner portion 38, both of which are formed of a metallic substance. Electrical leads 40 and 42 are operatively connected to outer portion 36 and inner portion 38, respectively, and to means for electrically exciting (not shown) driver device 34. Driver device 34 comprises any device for generating a pressure wave in first housing 22 to force a predetermined amount of liquid down the first housing 22 to exit aperture 32. In the preferred embodiment, driver device 34 comprises a piezoelectric device.

In the preferred embodiment, means for electrically exciting (not shown) comprises means for providing electrical pulses to said driver device 34. The means for providing electrical pulses could include the capability of being programmed to provide a single pulse upon command as well as a train of pulses with time or space between pulses being the same or varying in time or space.

Second housing 44 includes a first end 46 and a second end 48. Second housing 44 is positioned in a surrounding relationship to and coaxial with first housing 22 and driver device 34 and is spaced therefrom to form a cavity 50 therebetween. First end 46 is attached to annular surface 52 and shoulder 54 of lower portion 25 by adhesive material 53 and 55, respectively, while second end 48 is operatively attached to first end 24 of first housing 22 by adhesive material 49. Cavity 50 is filled with potting material 56 which is electrically insulative. Electrical leads 40 and 42 from driver device 34 pass through apertures 58 and 60, respectively, in the wall of second housing 44. The purpose of second housing 44 is to protect first housing 22 from any external physical forces. In the preferred embodiment, second housing 44 is tubular in shape and is formed of a metallic or hard plastic material.

With reference to FIG. 2, a partially completed picopump 10 is illustrated to show first housing 22 prior to the step of forming the tapered end portion 30 thereon. It will be appreciated that first end 24 is much greater in length prior to the formation of the tapered portion 30.

Figure 4:
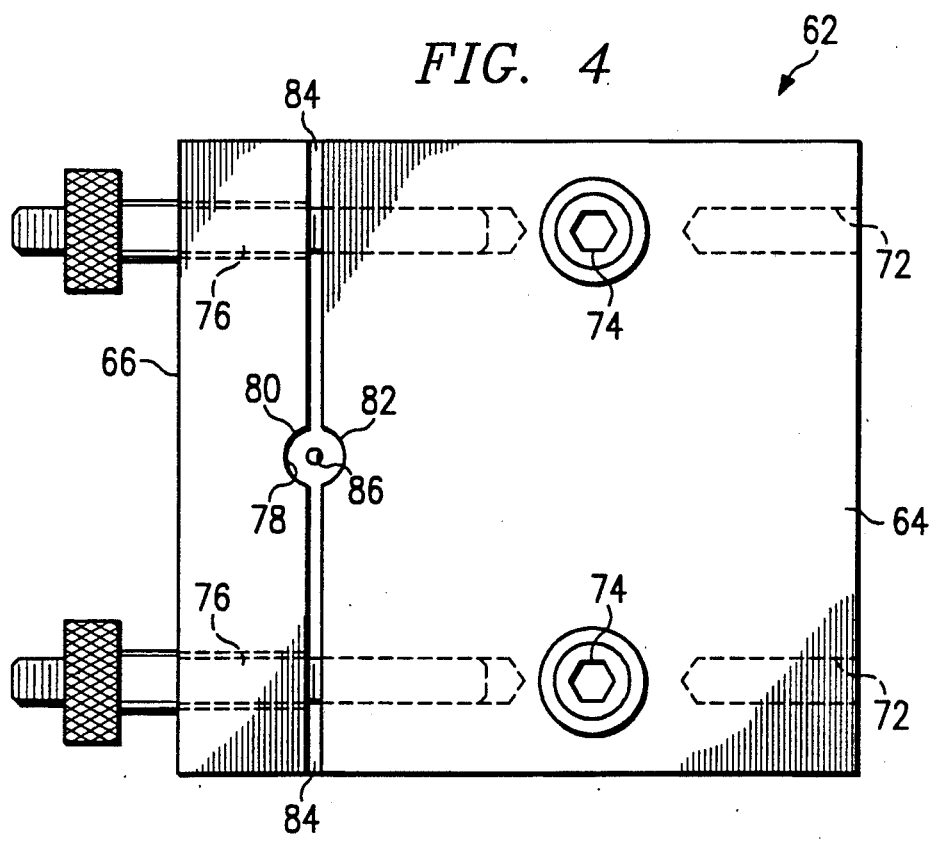
FIG. 4 is a simplified top plan view of the clamp and alignment tool used in the present inventive method.

FIGS. 3 and 4 illustrate the clamp and alignment tool 62 used in the present inventive method and comprises a first support member 64, a second support member 66 and a heat shield member 68. First support member 64 is removably attached to a vertical pippette puller 70 (see FIG. 5) by means of threaded cavities 72. Heat shield member 68 is removably attached to first support member 64 by fastening means 74. Second support member 66 is supported on threaded studs 76 which protrude from first support member 64 and allow second support member 66 to be moved toward and/or away from first support member 64 to support picopump 10 in the generally circular opening 78 formed by cutouts 80 and 82 by providing appropriate pressure against second housing 44. Heat shield member 68 includes shelf 84 which includes aperture 86 positioned to be in alignment with generally circular opening 78 to allow first housing 22 to protrude therethrough.

Figure 5:
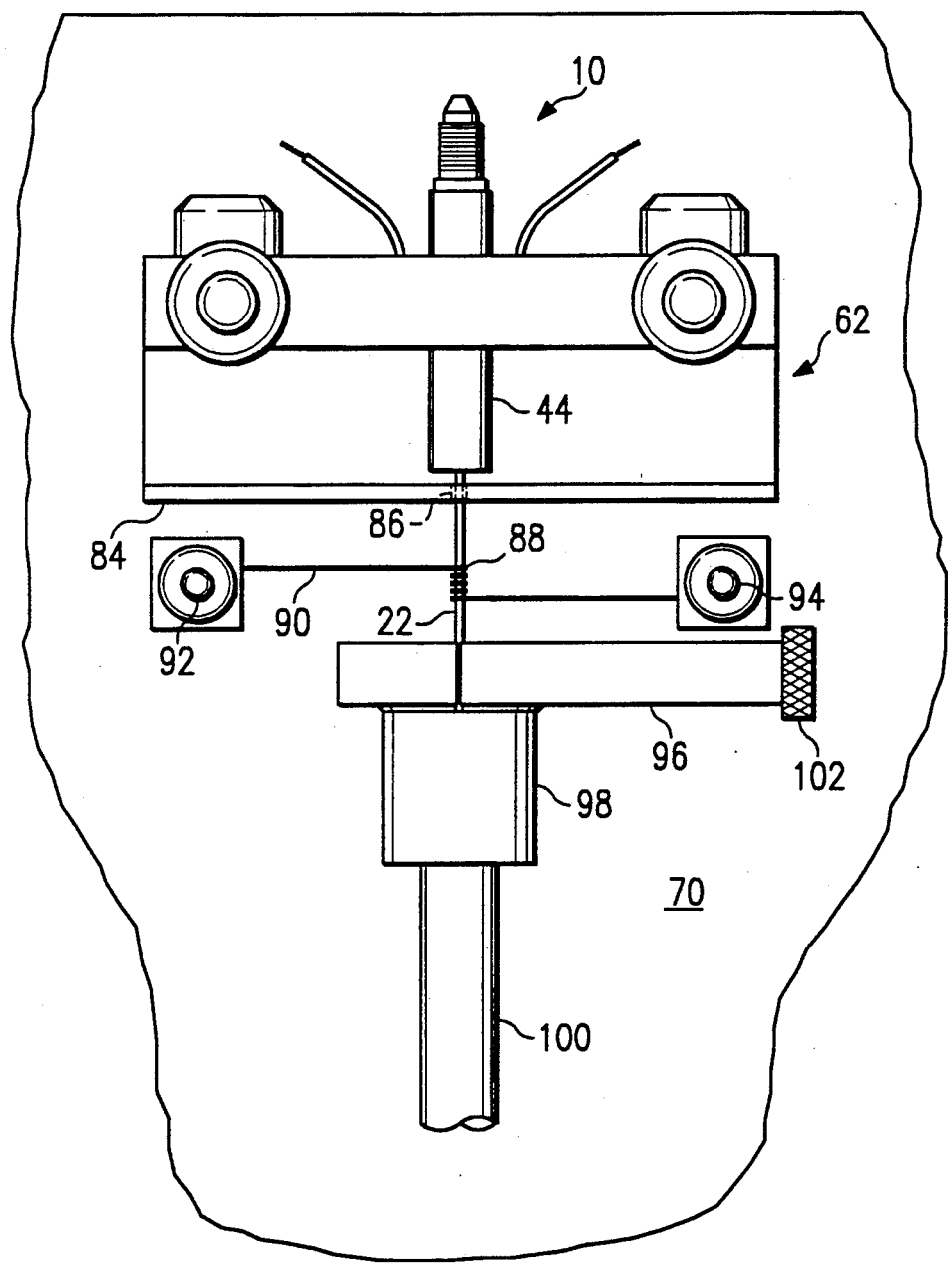
FIG. 5 is a simplified front elevational view of the clamp and alignment tool and a vertical pipette puller which are used in the present inventive method.

FIG. 5 illustrates the clamp and alignment tool 62 mounted on the front panel of a vertical pipette puller 70 as used in the present inventive method of making a picopump 10. Picopump 10 is positioned and clamped between first support member 64 and second support member 66 with first housing 22 extending through aperture 86 and coiled portion 88 of heating element 90. Heating element 90 is operatively connected between terminals 92 and 94 of vertical pipette puller 70 which are supplied electrical current from a source internal to vertical pipette puller 70. Shelf 84 acts to shield the picopump 10 from the heat generated by the heating element 90. Clamping means 96 includes tubular weight member 98 sized to receive shaft 100 which protrudes upwardly from the lower portion of vertical pipette puller 70. Tubular weight member 98 is free to move up and/or do shaft 100. Clamping means 96 is adjustable by knot 102 to clamp around first housing 22 whereby clamping means 96 together with tubular weight member 98 are supported by first housing 22.

The inventive method comprises the steps of forming the main body portion 12, attaching the second end of the first housing 22 to the second end portion 28 of main body portion 12 (with the bores being coaxial), attaching the driver device 34 to first housing 22, placing potting material 56 into cavity 50 of second housing 44, positioning second housing 44 around first housing 22 and attaching second housing 44 to lower portion 25 of main body portion 12. Picopump 10 is then positioned in the clamp and alignment tool 62 such that first housing 22 extends through aperture 86 and coiled portion 88 of heating element 90 and then clamped in that position. Clamping means 96 is slidably raised up shaft 100 and clamped around first housing 22 such that the weight of clamping means 96 and tubular weight member 98 is pulling downwardly on first housing 22. Electrical power is applied to terminals 92 and 94 such that heat is applied to that portion of first housing 22 positioned within the coiled portion 88 of heating element 90. Heat from coiled portion 88 softens (or melts) first housing 22 at the section where the heat is applied and the weight of clamping means 96 and tubular weight member 98 pulls the clamped end of first housing 22 downwardly with a resulting tapered end portion 30 being formed in first housing 22 at or near the coiled portion 88. After the tapered end portion 30 cools, picopump 10, as illustrated in FIG. 1, is removed from the clamp and alignment tool 62.

Although the invention has been disclosed above with regard to a particular and preferred embodiment, which is advanced for illustrative purposes only, it is not intended to limit the scope of this invention. For instance, although the inventive method has been set forth in a prescribed sequence of steps, it is understood that the disclosed sequence of steps may be varied. It will be appreciated that various modifications, alternatives, variations, etc., may be made without departing from the spirit and scope of the invention as defined in the appended claims.

What is claimed is:

1. A method of making apparatus for dispensing small amounts of fluids, said method comprising the steps of:
   forming a main body portion having an upper portion and a lower portion with a bore formed coaxially therethrough;
   forming a first housing having a first end, a second end and a bore formed coaxially therethrough;
   attaching said second end of said first housing to said lower portion of said main body portion such that said bores are coaxial;
   attaching a driver device, capable of generating a pressure wave in said first housing, to said first housing at a predetermined location;
   forming a second housing having a first end and a second end;
   attaching said first end of said second housing to said lower portion of said main body portion such that said driver device is enclosed by said second housing forming a cavity therebetween;
   attaching a weight to said first end of said first housing; and
   applying heat to said first housing at a predetermined location between said weight and said second end of said second housing, whereby said first end of said first housing is pulled away from said main body portion to form a tapered end portion on said first housing.

2. The method of claim 1 wherein said cavity between said second housing and said first housing is filled with potting material.

3. The method of claim 2 wherein said potting material is electrically insulative.

4. The method of claim 1 wherein said second end of said first housing is attached to said lower portion of said main body portion with adhesive.

5. The method of claim 1 wherein said first end of said second housing is attached to said lower portion of said main body portion with adhesive.

6. The method of claim 1 wherein said heat is applied to said first housing by an electrical heating coil.

7. The method of claim 1 further including the step of forming a threaded section on the upper portion of said main body portion.

8. The method of claim 1 wherein said first housing is formed from glass.

9. The method of claim 1 wherein said tapered end portion includes an exit aperture of one to fifty microns in diameter.

* * * * *

UNITED STATES PATENT AND TRADEMARK OFFICE
CERTIFICATE OF CORRECTION

PATENT NO. : 5,053,100

DATED : October 1, 1991

INVENTOR(S) : Donald J. hayes, et a.

It is certified that error appears in the above-identified patent and that said Letters Patent is hereby corrected as shown below:

Column 1, line 8, after "fluid" insert a period (.)
Column 3, line 45, change "do" to ---down---
Column 3, line 46, change "knot" to ---knob---
Column 3, line 67, clarify the blurred word to read ---coiled---

Signed and Sealed this

Fifth Day of January, 1993

Attest:

DOUGLAS B. COMER

Attesting Officer

Acting Commissioner of Patents and Trademarks